(12) United States Patent
Eiskamp et al.

(10) Patent No.: US 10,309,214 B2
(45) Date of Patent: Jun. 4, 2019

(54) SYSTEM AND METHOD FOR PERFORMING DISTANT GEOPHYSICAL SURVEY

(71) Applicant: GroundMetrics, Inc., San Diego, CA (US)

(72) Inventors: George Eiskamp, San Diego, CA (US); Greg Nieuwenhuis, Powell River (CA)

(73) Assignee: GroundMetrics, Inc., San Diego, CA (US)

( * ) Notice: Subject to any disclaimer, the term of this patent is extended or adjusted under 35 U.S.C. 154(b) by 264 days.

(21) Appl. No.: 15/287,262

(22) Filed: Oct. 6, 2016

(65) Prior Publication Data

US 2017/0097441 A1 Apr. 6, 2017

Related U.S. Application Data

(60) Provisional application No. 62/244,403, filed on Oct. 21, 2015, provisional application No. 62/237,832, filed on Oct. 6, 2015.

(51) Int. Cl.
*E21B 47/12* (2012.01)
*E21B 47/00* (2012.01)
(Continued)

(52) U.S. Cl.
CPC ............ *E21B 47/12* (2013.01); *E21B 7/04* (2013.01); *E21B 47/00* (2013.01); *E21B 47/022* (2013.01);
(Continued)

(58) Field of Classification Search
CPC .. E21B 47/00; E21B 47/022; E21B 47/02216; E21B 47/02224; E21B 47/12; E21B 47/121; E21B 47/122
See application file for complete search history.

(56) References Cited

U.S. PATENT DOCUMENTS

| 4,553,097 A | 11/1985 | Clark |
| 6,065,538 A * | 5/2000 | Reimers ............... E21B 23/03 |
| | | 166/250.01 |

(Continued)

FOREIGN PATENT DOCUMENTS

| WO | WO 2015/073393 | 5/2015 |
| WO | WO 2015/127211 | 8/2015 |
| WO | WO 2015/153983 | 10/2015 |

OTHER PUBLICATIONS

Asch et al., "*Mapping and Monitoring Electrical Resistivity with Surface and Subsurface Electrode Arrays*", Geophysics. vol. 54, No. 2, Feb. 1989, pp. 235-264, 18 Figs.

*Primary Examiner* — David J Bagnell
*Assistant Examiner* — Tara E Schimpf
(74) *Attorney, Agent, or Firm* — Diederiks & Whitelaw, PLC.

(57) ABSTRACT

A downhole drilling tool is adapted to be placed in a borehole formed in the earth. The downhole drilling tool has mounted thereto at least one of a transmitter for generating and a receiver for sensing at least one component of an electromagnetic field within a distant earth region. The tool also has a device configured to acquire subsurface data from the at least one component of the electromagnetic field; and a device configured to calculate a resistivity distribution of the distant earth region from the subsurface data. A geophysical survey is performed with a downhole drilling tool by transmitting at least one component of an electromagnetic field through the distant earth region; acquiring subsurface data from the at least one component of the electromagnetic field; and calculating a resistivity distribution of the distant earth region from the subsurface data.

23 Claims, 8 Drawing Sheets

(51) Int. Cl.
*E21B 47/022* (2012.01)
*E21B 7/04* (2006.01)
*E21B 49/00* (2006.01)
*G01V 3/26* (2006.01)

(52) U.S. Cl.
CPC .. *E21B 47/02216* (2013.01); *E21B 47/02224* (2013.01); *E21B 47/121* (2013.01); *E21B 47/122* (2013.01); *E21B 49/00* (2013.01); *G01V 3/26* (2013.01)

(56) References Cited

U.S. PATENT DOCUMENTS

| | | | |
|---|---|---|---|
| 6,308,787 B1 * | 10/2001 | Alft | E21B 7/06 175/48 |
| 6,315,062 B1 | 11/2001 | Alft et al. | |
| 9,405,032 B2 | 8/2016 | Hibbs | |
| 2007/0024464 A1 * | 2/2007 | Lemenager | E21B 47/122 340/853.1 |
| 2010/0259267 A1 * | 10/2010 | Rosthal | G01V 3/30 324/339 |
| 2012/0056623 A1 * | 3/2012 | Esmersoy | G01V 3/28 324/332 |
| 2012/0253680 A1 * | 10/2012 | Thompson | G01V 11/007 702/13 |
| 2015/0160364 A1 | 6/2015 | Hibbs | |
| 2015/0219784 A1 | 8/2015 | Hibbs et al. | |
| 2016/0282501 A1 | 9/2016 | Hibbs | |

* cited by examiner

SYSTEM AND METHOD FOR PERFORMING DISTANT GEOPHYSICAL SURVEY

CROSS REFERENCE TO RELATED APPLICATIONS

This application claims the benefit of U.S. Provisional Application No. 62/237,832, which was filed on Oct. 6, 2015 and titled "Electromagnetic Geosteering and Wellbore Trajectory Estimation", and U.S. Provisional Application No. 62/244,403, which was filed on Oct. 21, 2015 and titled "Capacitive Logging System". The entire content of these applications is incorporated herein by reference.

BACKGROUND OF THE INVENTION

The embodiments described herein relate generally to soundings within the earth based upon electrical fields. As used herein, "earth" or "Earth" generally refers to any region in which a borehole may be located including, for example, the lithosphere. Electromagnetic (EM) geophysical surveys probe electrical resistivity, or equivalently, conductivity, in the earth as a function of depth. Typical targets of interest include ore bodies, hydrocarbons, water, steam, proppants, hydraulic fracture (or fracking) fluids, salts and other substances injected into the ground, and geological or formation features surrounding such targets as well as environmental pollutants. Geophysical exploration is also used for regional characterization to determine if a particular area displays particular characteristics (e.g. diamond exploration relies on focusing on regions which display particular characteristics of the lithosphere-asthenosphere boundary along with other markers). Since the resistivities of such targets and the surrounding medium or surrounding geology may be quite dissimilar, the targets may be discriminated by measuring their subsurface resistivities when subjected to an electromagnetic field. Using this methodology, the depth, thickness, lateral extent and characterization of materials, or the characterization of an entire 3D volume of interest may be determined or monitored.

The source of the EM field used in a geophysical survey may naturally occur or be manmade. Whether naturally occurring or manmade, the source may produce a primary magnetic and/or electric field that varies in time, and this primary field produces a secondary field in a conductive medium such as the earth. For example, an applied primary electric field produces electric currents in the earth that have an associated time varying magnetic field, and a time varying magnetic field induces electric currents that result in a secondary electric field. The electrical properties of the earth and rate of change of the field determine the relative magnitudes of the secondary field to the primary field. The combination of primary and secondary fields results in combined electromagnetic interaction with the earth even for a source arranged to produce solely a time varying electrical or magnetic field.

The distribution of electric current flow produced by an EM source is in large part determined by the three-dimensional (3D) resistivity distribution within the earth. Given a well-chosen set of electric field measurements at the surface or at depth within a borehole, together with a sufficient placement of source electrodes, the 3D resistivity variation over the region where current is flowing may be inferred. The current is typically measured by a suitably calibrated array of electric and/or magnetic field sensors. The resulting 3D resistivity variation can be used to project the distribution of ores, hydrocarbons, water or other targets within the measured volume.

The understanding of the relationship of subsurface geology and wellbore placement is limited to either surface systems, which provide overall low distance resolution and/or formation property accuracy, or downhole systems, which only have the ability to investigate the area immediately around the wellbore. This affects well placement, reservoir production and drilling safety because there is not a full understanding of the subsurface geology between the wellbores and ahead of the bit during the drilling process. Employing methods to create and enhance 1D, 2D, 2.5D and particularly 3D resistivity mapping of subsurface formations provides a more complete understanding of the environment, improves reservoir recovery and decreases the impact of unexpected hazards and changes ahead of the bit.

Many factors come into play in the effective placement of wellbores in positions to produce a maximum volume of hydrocarbons while avoiding drilling and completion problems. Two significant factors are the understanding of what fluids are in the formations and the correlation of the wellbore to the depth of the formations. Better wellbore placement (e.g., through geosteering) can improve drilling efficiency, increase hydrocarbon production, extend reservoir life and avoid drilling hazards such as pore pressure and encountering of unexpected geological features that result in drilling fluid loss or other problems. Current methods to place the wellbore within a subsurface geology are surface and subsurface seismic, EM and seismic tomography, and wellbore formation evaluation logging. Each of these has limitations in resolving information about the fluid in the formations and in distance resolution, and/or they are operationally intrusive (i.e., they require significant changes in work methods, which is costly).

Resistivity is the primary method used to determine whether hydrocarbons or saltwater are present in formations. Seismic information requires knowledge of the low frequency sound velocity in each formation to determine distance, access to cost-prohibitive equipment and does not provide resistivity values used to determine formation fluid type. Tomography requires access to producing wellbores, which are typically not located in optimal locations to allow evaluation, and production has to be halted during the tomography process. Use of drilling formation evaluation tools provides high accuracy resistivity values with distance from wellbore placement but has a very limited depth of investigation (that is, how much subsurface geology can be mapped) and are limited or cannot investigate regions in front of the drill. To summarize, seismic data typically has low distance resolution and no resistivity information about what fluids are in the formations. EM and seismic tomography methods (as well as cross-well EM methods) require access to existing wellbores and that production be halted, therefore making them unlikely to be used during the drilling process. Logging-while-drilling (LWD) formation evaluation tools have acceptable resistivity and distance accuracy, but the depth of investigation is limited to 20 to 100 feet from the wellbore and generally if not always only lateral to the wellbore.

FIGS. 1-3 are for reference and meant to introduce a small fraction of the configurations possible. For example, they show a plurality of deviated and horizontal wells, but configurations can be as simple as a single vertical well. FIG. 1 represents a shale well arrangement (unconventional) where many wells 100 are drilled from confined surface locations to many reservoir laterals. Secondary surface locations (coming in from the right relative to FIG. 1) can be seen interacting with the primary pad. The area shown is approximately 9 square miles. FIG. 2 is an isometric view of four horizontal wells 200-203. The patterned block around well 202 is somewhat representative of current resistivity mapping capabilities, with different patterns representing different resistivity values, although the depth of investigation is not to scale. FIG. 3 represents a traditional offshore platform configuration where wells are deviated to reservoirs (i.e., not horizontal). In particular, a plurality of wells is shown coming from two platforms (not visible), with a first set of wells 300 corresponding to the first platform and a second set of wells 305 corresponding to the second platform. FIG. 4 is also for reference and meant to show the prior art related to downhole logging-while-drilling resistivity tools. Specifically, FIG. 4 shows a logging device 30 from U.S. Pat. No. 4,553,097, which is incorporated herein by reference.

More generally, the prior art as a whole shows that the resistivity of any subsurface geology can be imaged using various surface methods. The issue is that these surveys are limited in their depth extent, have accuracy and resolution limitations, and can be negatively influenced by galvanic surface sensor setup and performance, including but not limited to electrochemical behavior and noise caused by poor coupling to the earth. Other techniques have been developed that partially address these limitations but also introduce other issues. These techniques include the use of EM tomography and logging-while-drilling tools. However, EM tomography requires wellbore intervention, has a fixed subsurface volume it can image, and has no real-time applicability. Logging-while-drilling tools cannot see in front of the drilling bit and only a very limited subsurface volume around the wellbore being drilled can be imaged.

Traditional EM surveys, such as surface-to-surface EM, borehole-to-surface EM and cross-well EM, as well as depth-to-surface EM and the more theoretical surface-to-depth EM methods, utilize just one or a small plurality of source points. For example, for borehole-to-surface methods, the surveyor might deploy a source electrode down a vertical borehole and transmit at just four different depth locations. Transmitting at more than one depth location improves resolution, but increasing the number of transmit depths quickly diminishes in added value and dramatically increases costs. Additional background information is included in U.S. Pat. No. 9,405,032, U.S. Patent Application Publication Nos. 2015/0160364 and 2015/0219784 and International Patent Application Publication Nos. WO 2015/073393, WO 2015/127211 and WO 2015/153983, which are incorporated herein by reference.

SUMMARY OF THE INVENTION

This invention relates to the creation and use of subsurface resistivity mapping with sufficient accuracy and distance resolution for use during the planning, drilling, logging, and reservoir production processes. Preferably the mapping is 3D, but 2.5D, 2D and even 1D can be useful as well. This invention improves the understanding of the macro level view of the subsurface geology and/or formation fluids and the position of the wellbore with respect to the formation and/or fluids via the use of capacitive sensors, one or more sources, processing software, and interpretation software. The use of capacitive sensors improves the signal-to-noise ratio and the stability, repeatability and reliability of downhole tools and surface sensors. Preferably multiple sources are used to illuminate the subsurface formations from various positions, with one or more sources being located, for example, on the surface, the downhole drilling tool or the drill string itself (with the use of a gap sub). A borehole conductor can also be used as one of the sources. A borehole conductor can comprise any conductive material or combination of conductive materials associated with a borehole, including but not limited to the casing, tubing, rods, wires, cables, and/or fluids. Alternatively, a borehole conductor comprises a conductor added to the borehole, either temporarily or permanently, such as an electrode commonly used in borehole-to-surface methods. Preferably real-time and post-processed data are used in conjunction with other data to improve confidence in the interpretation.

This invention has applications to drilling processes (real-time and near-real-time) and reservoir exploration and production operations. These include but are not limited to subsurface geology and reservoir mapping/characterization, pore pressure prediction and fault identification ahead of the drill bit, wellbore placement within the desired formations, and reducing physical locational errors that can arise due to survey errors (the "ellipse of uncertainty") between adjacent wellbores.

This invention is directed to systems and methods for determining a large-scale (on the order of one kilometer or multiple kilometers) 3D volume of subsurface resistivity relative to a borehole being drilled through the block for the purpose of placing the wellbore within the desired formations and avoiding drilling hazards (e.g., pore pressure and fault crossing), as well as establishing a baseline for a snapshot-, time-lapse-, or continuous monitoring-resistivity evaluation to map or characterize or otherwise assess the overall reservoir resistivity or to calculate saturation.

The system preferably comprises various combinations of EM sources, EM sensors, system controls, source controls, data collection and distribution, data processing and data presentation. Components are placed on or near the surface and/or downhole. In addition, a borehole conductor of the existing well or a nearby well can be used as a source. The specific configuration will be application, environment, and cost/performance tradeoff dependent.

The method generally involves first modeling or estimating the resistivity response of the subsurface geology for the desired application, optimizing source and sensor configuration (location, amplitude, and frequencies), deploying or installing the system, establishing a baseline system response before drilling begins or even during drilling, continuously or intermittently monitoring the system response as drilling continues and/or during drilling breaks (e.g., connection) and determining the bottom hole assembly (BHA) location relative to the baseline resistivity map or a continually updated map. To enhance the resolution of the BHA location and subsurface geologic resistivity map, downhole sources and sensors are preferably employed to better illuminate the BHA and formations and/or provide additional data inputs into the processing algorithms. A significant component of processing is the comparison of the large-scale 3D resistivity map to traditional formation evaluation resistivity measurements made in the borehole (and as available compare to other geological, geophysical, and engineering data) and then constraining the BHA location using independent and/or joint measurements.

Depending on the application, this processing is done during the drilling process (i.e., real-time or near-real-time) and/or after the wellbore is completed and the data stored downhole is retrieved on the surface (i.e., post process). Post-processed data can be used to improve the resolution and accuracy of the real-time data for use during long-term reservoir resistivity map monitoring. If the real-time or near-real-time method is used, the processing can be performed downhole, on the surface, or both.

The use of the terms "source" and "sensor" refer to any structure that will generate or detect, respectively, one or more components of an electromagnetic signal (e.g., dipole, loop, galvanic). Specific to this invention, the use of a capacitive sensor is also relied upon to enable a higher level of resistivity accuracy and resolution as well as operation in terrains, environments, geologies, formations or fluids where other types of sensors do not perform well. Some consider induced polarization to be an electromagnetic method. For clarity, this body of work encompasses induced polarization methods.

In particular, the present invention is directed to an electromagnetic geophysical survey performed using a drilling tool including a drill string, a bottom hole assembly and a capacitive sensor. Current is transmitted from a first source into the earth, and the current generates an electromagnetic field. The electromagnetic field is measured with the capacitive sensor to create subsurface data, and a resistivity distribution of the earth is calculated using the subsurface data. The bottom hole assembly is steered with the aid of the resistivity distribution.

Preferably, the bottom hole assembly includes the capacitive sensor, and the electromagnetic field is measured while the bottom hole assembly is located in a borehole. The system is sensitive to a direction from which the electromagnetic field is received. The direction or location from which the electromagnetic field is received by the system is determined, and that information is used to determine which volume of the earth is being measured system. The resistivity distribution of the earth is calculated using information about the volume.

More particularly, the invention specifically provides for resistivity mapping of a distant earth region utilizing the downhole drilling tool as either a transmitter or receiver of at least one component of a generated electromagnetic field, whether for mapping in front of the downhole drilling tool or mapping a wide regional volume of earth between the drilling tool in a borehole and either one or more surface or near surface locations or one or more additional boreholes. Correspondingly, the system includes the related structure to carry out this operation. Overall, the invention also improves the understanding of the macro level view or image of subsurface formation fluids and the position of the wellbore with respect to those fluids, preferably via the use of capacitive sensors, one or more sources and processing software.

In one embodiment, the capacitive sensor constitutes a first sensor, and the electromagnetic field is also measured with a second sensor. The second sensor measures the electromagnetic field at or near the surface of the earth. In another embodiment, current is also transmitted from a second source into the earth. Current is transmitted from the first source at or near the surface of the earth, and current is transmitted from the second source within a borehole. In yet another embodiment, the second source is a conductive casing in the borehole or a borehole conductor.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Figure 1:
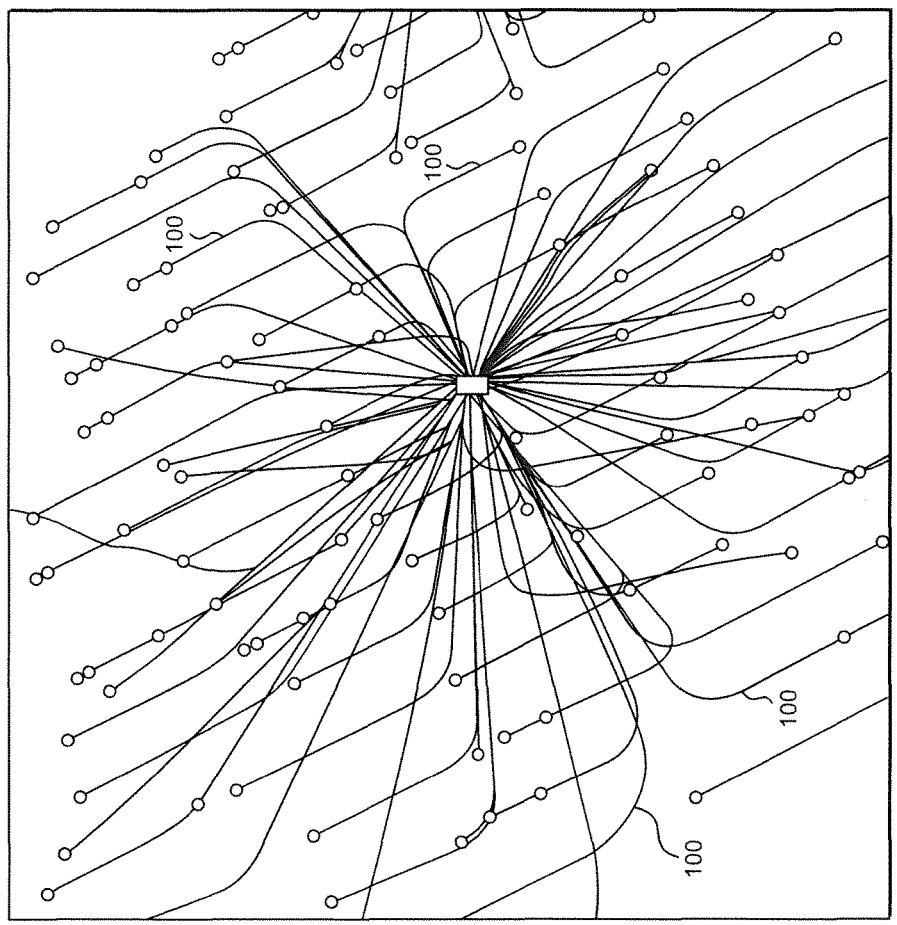
FIG. 1 shows a shale well.
Figure 2:
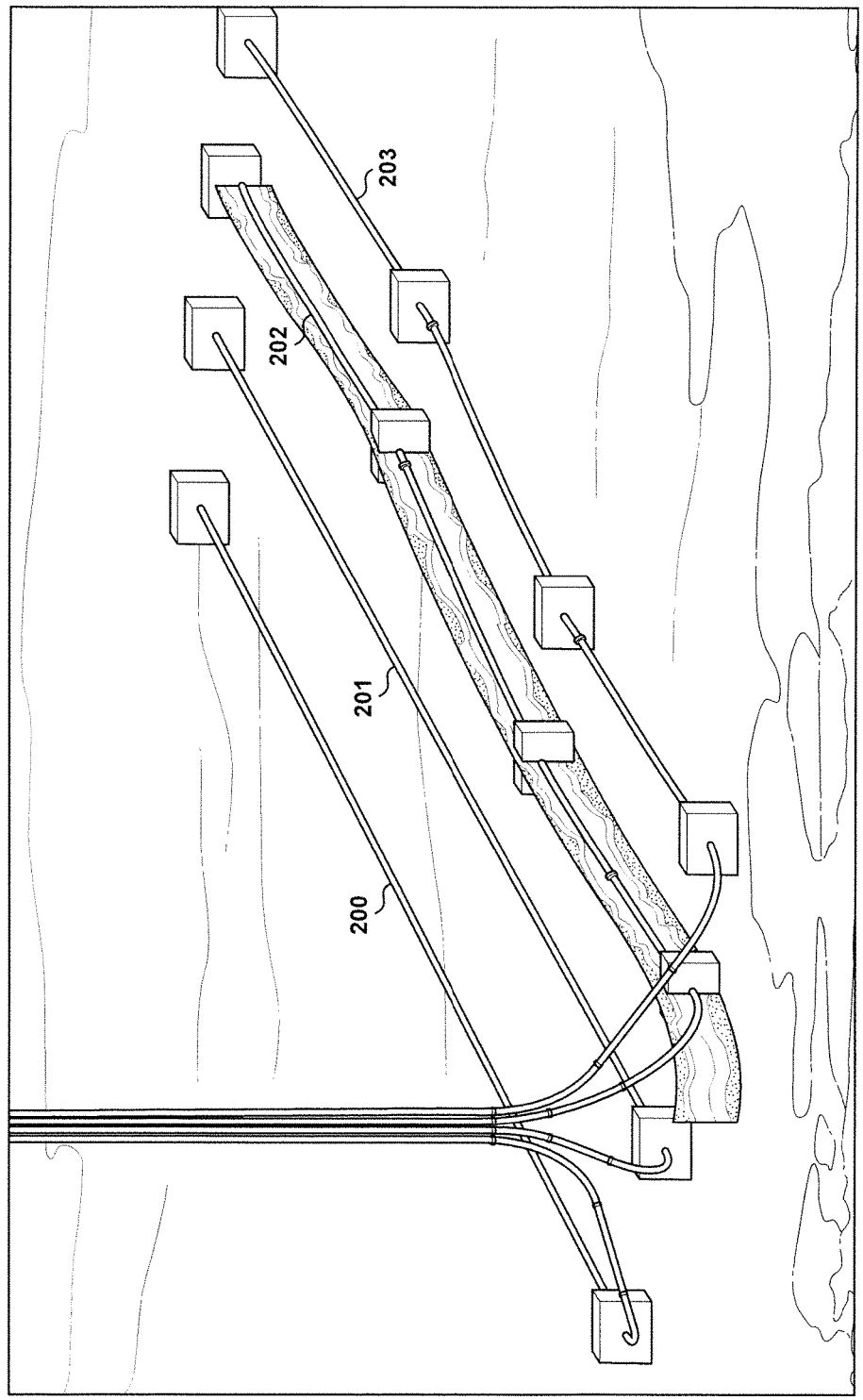
FIG. 2 is an isometric view of a known four horizontal well arrangement.
Figure 3:
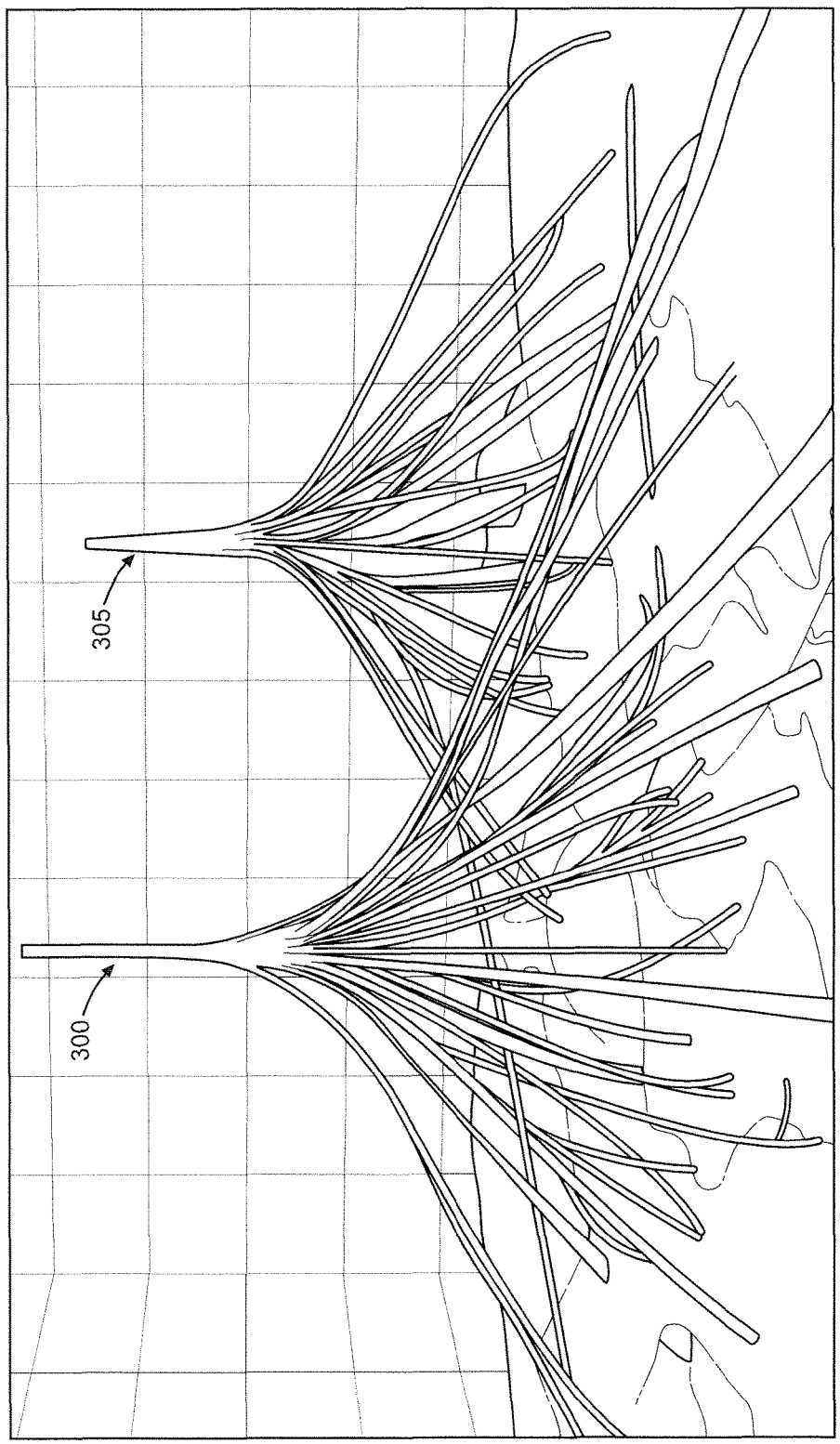
FIG. 3 illustrates a traditional offshore platform configuration where wells are deviated (not horizontal) to reservoirs.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the present invention provides many inventive concepts that may be embodied in a wide variety of contexts. The specific aspects and embodiments discussed herein are merely illustrative of ways to make and use the invention and do not limit the scope of the invention. It would be impossible or impractical to include all of the possible embodiments and contexts of the invention in this disclosure. Upon reading this disclosure, many alternative embodiments of the present invention will be apparent to persons of ordinary skill in the art.

The description below illustrates different method for monitoring a resistivity volume and/or a conductive bottomhole-assembly or drill string as a well is drilled to better place the borehole within the desired subsurface formations, avoid or manage drilling hazards, improve the overall map or characterization of reservoir or formation resistivity and establish a baseline for ongoing reservoir monitoring and/or a foundation for making future field development or other exploration and production decisions. With the wide variety of well and formation combinations, no one document can capture all embodiments. These methods apply to all wellbore configurations (vertical, deviated and horizontal) on land, offshore (including oceans, bays, rivers, lakes and swamps) and in transition zones. Also, these methods are usable in but are not limited to the following industries: oil and gas, geothermal, mining, carbon dioxide sequestration and water exploration, water management or evaluation, and waste water disposal.

The system of the present invention can advantageously provide benefit to both real-time and long-term reservoir monitoring. The system eliminates the requirement for wellbore intervention (i.e., placing a source in existing producing well) and allows resistivity maps to be produced and updated in real time or near real time at an accuracy and distance resolution level that provides information in the range needed to fulfill application requirements. The system also allows for a larger sample of source points to be acquired more efficiently throughout the formation, which produces a greater area that is illuminated in an optimal manner, and/or allows for more sensing points to be acquired more efficiently throughout the formation, which improves data acquisition coverage and therefore improves quality, accuracy and resolution. This is similar to offshore controlled source electromagnetic methods (CSEM). In offshore CSEM, the sensors are placed on the seabed, and a source is towed, with the source transmitting near the ocean floor (above the sensors). In the present invention, termed underground controlled source electromagnetic methods (uC-SEM), the sensors are still at or near the surface (onshore) or at or near the seabed (offshore), but the source, transmitting from the downhole drilling tool, moves underground through the earth/formation. The benefits are obvious to those skilled in the art. In short, the closer the source is to the area of interest (i.e., the target geology, fluids or formation), the better the data quality, accuracy and/or resolution. Moving horizontally or approximately horizontally through the formation improves survey results laterally as well as vertically. Although contrasted with offshore CSEM, uCSEM can be applied offshore as well.

The novel aspects of this system include the ability to create a variety of source (transmitter) and sensor (receiver) combinations to illuminate the desired subsurface geology, the EM processing capabilities, and preferably the use of the capacitive sensor downhole and/or at or near the surface. These items can be implemented at any given well individually or with any combination to improve the system data quality to a level such that the needed data can be achieved to produce a useful, preferably 3D, subsurface geology resistivity distribution (or map or cube). It should also be evident this flexibility enables the configuration of the system to provide only 2.5D, 2D or 1D resistivity data if it is desired to trade accuracy and precision for speed and cost reduction.

Figure 5:
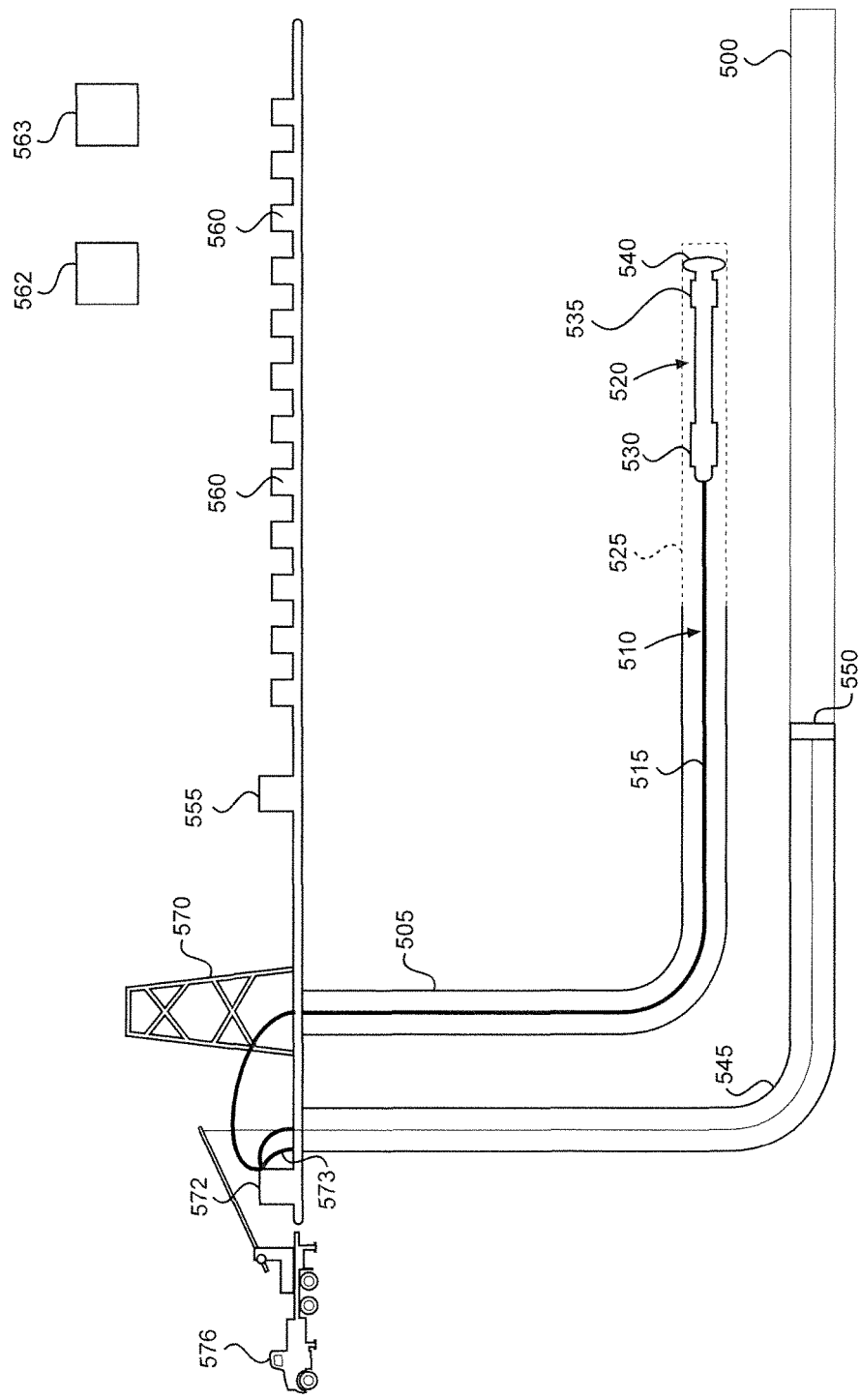
FIG. 5 is a vertical cross sectional view of two horizontal wells.
Figure 6:
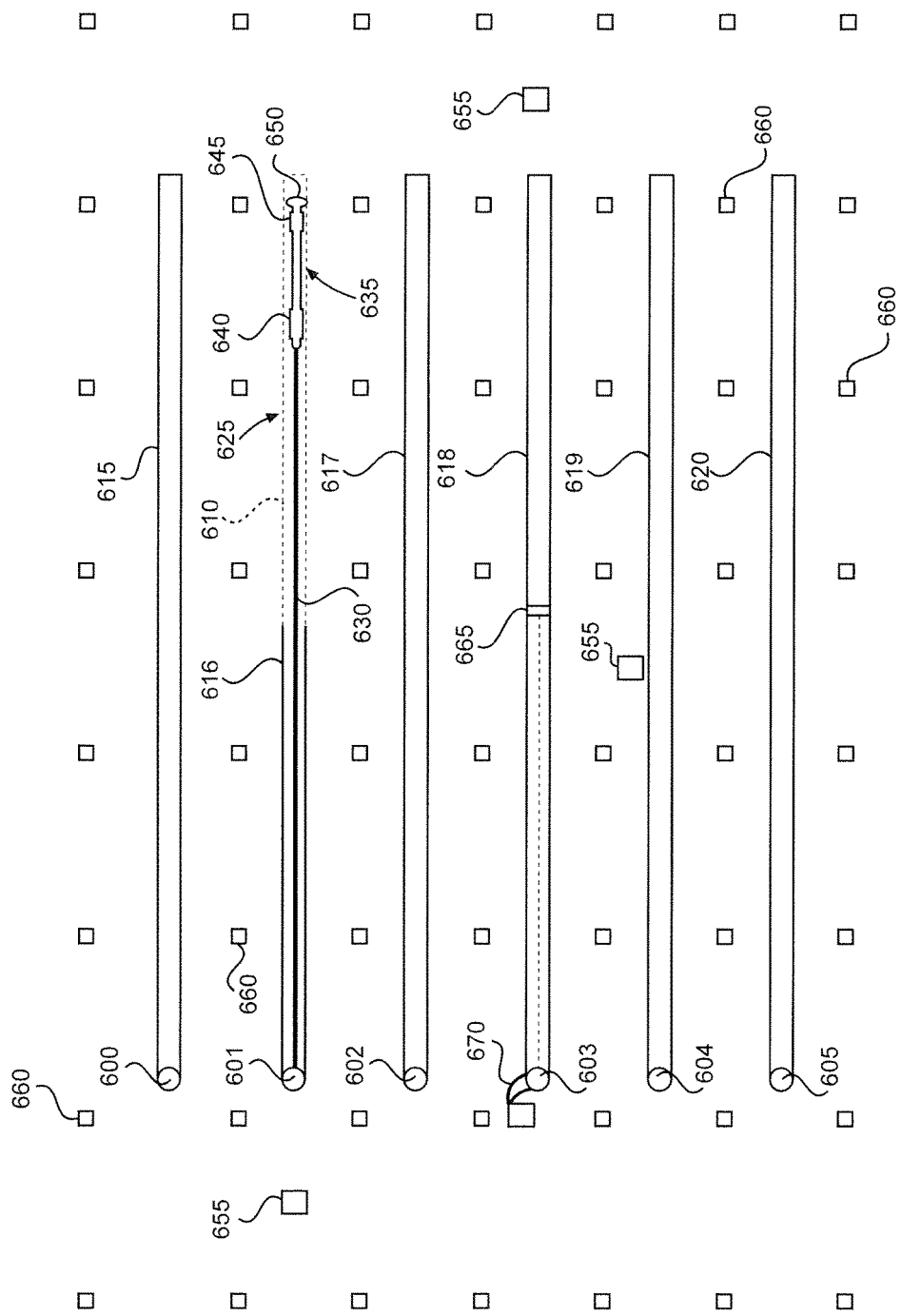
FIG. 6 is a plan view of a set of wells similar to those shown in FIG. 5.

FIG. 5 is a vertical cross sectional view of two wells. The wells of FIG. 5 can be one above the other, as shown, or offset in the plane of FIG. 5, as in FIG. 6. FIG. 5 illustrates various possible sensor and source relationships. Although FIGS. 5 and 6 show multiple wells, in practice, the methods of the present invention can be used on a single well (without the use of a casing source). In surface sensor deployments, the sensors appear to be sitting on the surface, which is one possible deployment modality, but they can be buried and/or propped above the ground as well. Furthermore, when the downhole drilling tool, which includes the bottom hole assembly and the drill string, is used as a source, it can transmit continuously while in motion or in a stop-and-go manner. More specifically, FIG. 5 contains two wellbores: a cased borehole 500 and a drilled hole 505 with a distant earth region extending between them. A downhole drilling tool 510, made up of a drill string 515 and a bottom hole assembly (BHA) 520, is located in drilled hole 505. Bottom hole assembly 520 is in an open hole 525 (i.e., an uncased portion of drilled hole 505) and contains a downhole source (transmitter) 530, a downhole sensor (receiver) 535 and a drill bit 540. As such downhole source 530 and downhole sensor 535 are arranged to provide for resistivity mapping of a distant earth region. Preferably, sensor 535 comprises one or more capacitive sensors. Depending on the application, downhole source 530 and sensor 535 are preferably connected to devices that allow for real-time control and/or bidirectional communication or to devices that only transmit, receive, store, and process data based on a preplanned program. This arrangement allows for mapping in front of drilling assembly 510 or a wide regional volume of earth from a drilling tool containing borehole 505 to either one or more surface or near surface locations 555, 560 or to one or more additional boreholes e.g. cased hole 500. Cased hole 500 is a well previously drilled and completed with a casing 545. Cased hole 500 can be in a known position relative to the reservoir resistivity map. Also, cased hole 500 can contain a downhole source 550 (as described in U.S. Patent Application Publication No. 2015/0160364, which is incorporated herein by reference), or casing 545 can be used as a source (as described in U.S. Patent Application Publication No. 2015/0219784, which is incorporated herein by reference). Combinations of independent surface sources and sensors (e.g., surface source 555 and sensors 560) are located on the ground or seabed in known spatial relationship to the planned well path. Preferably, additional near remote sensors 562 or far remote sensors 563 are also provided. In an established practice, all sources and sensors are connected to data control or acquisition systems that in turn pass the data to processing, storage and display components. All sources and receivers can be independently controlled or can be configured to function as a single large scale device. For example, a source 572 is shown directly connected to casing 545 by a wire 573. Additionally, while a derrick 570 supports drilling assembly 510 and a vehicle 576 supports downhole source 550, two vehicles or two derricks could be used.

FIG. 6 is a plan view of a set of wells similar to those shown in FIG. 5. In particular, six wellbores 600-605 are shown. The second wellbore from the top (wellbore 601) is the well being drilled. Accordingly, wellbore 601 includes both an open hole 610 and a casing 616. The remaining wellbores are cased. Specifically, wellbores 600 and 602-605 include casings 615 and 617-620. FIG. 6 contains the same general components as FIG. 5 with the addition of multiple surface sources. Surface sources may be any one or combination of electric or magnetic source types including but not limited to any form of direct electrical connection which allows current to travel from an electrical transmitter into the earth galvanically (such as through grounding rods), and any form of source which use electrical induction to excite currents in the ground without a direct electrical connection (such as loop sources or magnetic sources). Specifically, a downhole drilling tool 625 is located in wellbore 601. Drilling assembly 625 includes a drill string 630 and a bottom hole assembly 635. Bottom hole assembly 635 includes a source (transmitter) 640 for generating at least one component of an electromagnetic field; a sensor (receiver) 645 for sensing at least one component of the electromagnet field between downhole drilling tool 625 and a distant earth region; and a drill bit 650. Preferably, sensor 645 comprises one or more capacitive sensors. The locations of surface sources 655 and surface sensors 660 are for illustration. Preferably, source and/or counter electrodes would be positioned and utilized in a manner to assist with the system's sensitivity to the direction from which the EM signal is being received, including but not limited to in front of the drill. Sources 655 and sensors 660 are placed in any configuration (e.g., orthogonal, in-line, radial, tangential, or via a north/south or east/west grid) or at any density or spacing or at varying densities based on modeling results or other survey design factors like performance rules of thumb or land accessibility. Surface sensors 660 could be spaced by at least ⅕ mile. Of wellbores 600 and 602-605, only wellbore 603 is shown as including a downhole source 665 or a borehole conductor (i.e., a casing conductor 670). However, additional downhole sources and/or borehole conductors can be used in wellbores 600 and 602-605.

It should be noted that once the casing of a previously drilled hole is put in place, it becomes part of the target subsurface geology being mapped and may be represented by a very low resistivity (high conductivity) area. As such, the locations of cased wells relative to the target well will be known, and, in addition to knowing the resistivity map, a relative position map in terms of distance can be produced for one or more wells within the subsurface block or may be mitigated through data processing or survey design methods.

Figure 4:
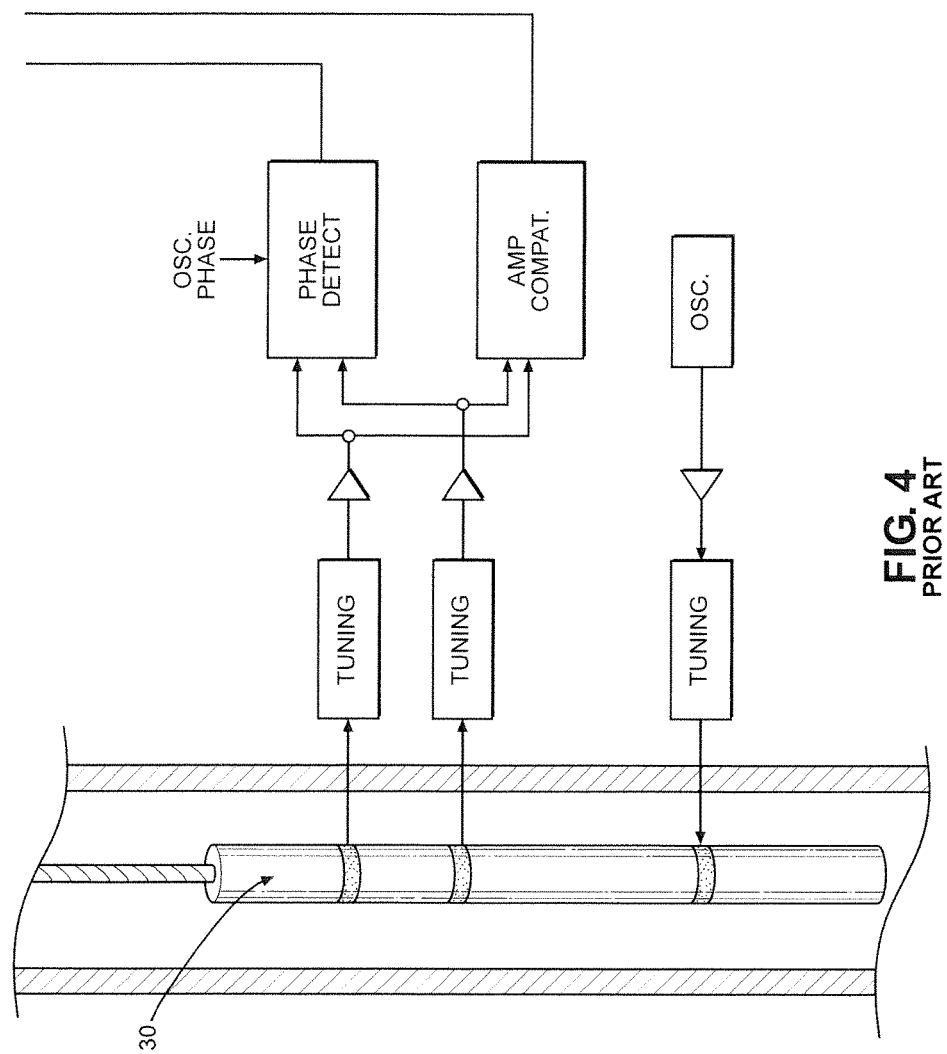
FIG. 4 depicts a prior art downhole logging-while-drilling resistivity tools.
Figure 7:
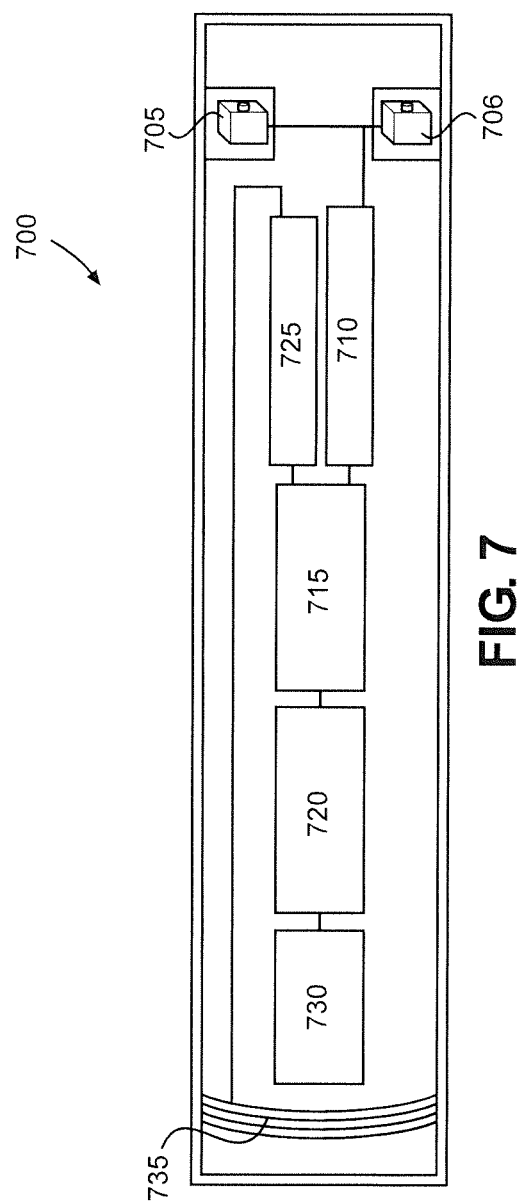
FIG. 7 is a simplified view of a downhole tool containing a capacitive sensor.

With respect to the various sensors discussed above, existing technology such as galvanic sensors or magnetic sensors can be used. However, the use of capacitive sensors is preferred as this significantly enhances the signal response (including sensitivity and/or stability) and allows other system features to be minimized. In FIGS. 5 and 6, sensors are located in the bottom hole assemblies (i.e., bottom hole assemblies 520 and 635). Alternatively, or in addition, sensors can be located in the drill strings coupled to the bottom hole assemblies (i.e., drill strings 515 and 630) and sensors can be located at or near the surface. FIG. 7 shows a simplified view of a downhole tool 700 containing capacitive sensors 705 and 706. It should be noted that capacitive sensors, unlike traditional loop sensors (see FIG. 4 and the transmitter of FIG. 7), are not necessarily provided around the circumference of the tool body. Also, capacitive sensors can be more sensitive to the direction from which the EM signal is being received. As such, capacitive sensor can provide information relating to the orientation of the origin of the EM signal (i.e., azimuthally sensitive for directional resistivity imaging). This aids in the determination of what volume of subsurface geology the sensor is measuring and not simply an omnidirectional response from all the subsurface geology around the borehole. However, omnidirectional response sensors utilized in this system configuration i.e., with a plurality of source and sensor locations, can provide directional information as well. The remainder of FIG. 7 shows the interface between directionally sensitive capacitive sensors 705 and 706 and the related electronics, which constitute a device configured to acquire subsurface data from the electromagnetic field and calculate a resistivity distribution. Specifically, tool 700 includes a receive circuit 710 connected to capacitive sensors 705 and 706. Receive circuit 710 is also connected to a converter 715, which converts analog signals to digital signals and vice versa. Converter 715 is connected to a processor 720 and a drive circuit 725. Processor 720 is connected to a system control 730, while drive circuit 725 is connected to a transmitter 735.

Figure 8:
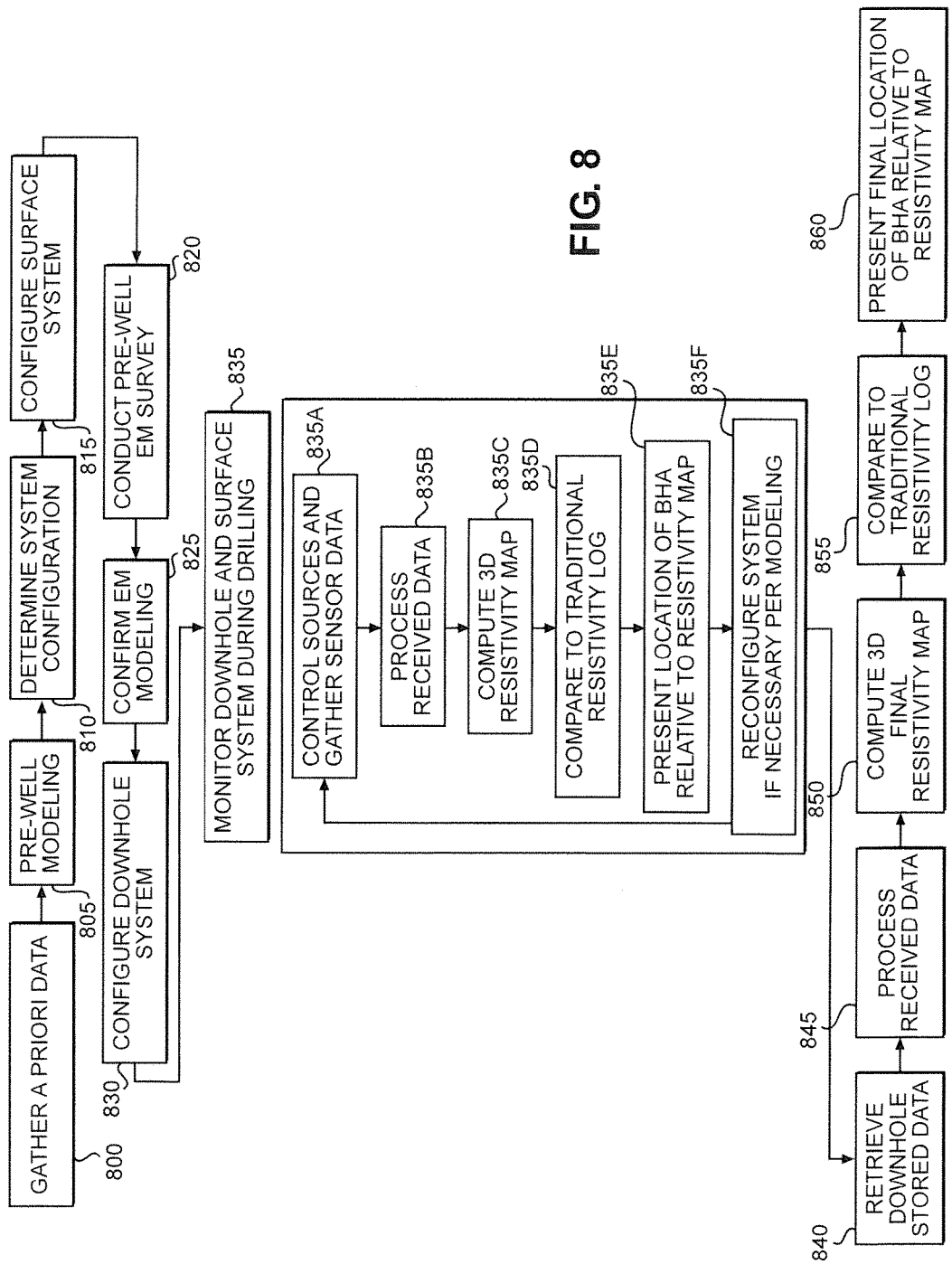
FIG. 8 illustrates one embodiment of the workflow used to generate a real-time and post-processed resistivity map with a borehole placed within a subsurface volume.

FIG. 8 illustrates a preferred embodiment of the workflow used to generate a real-time or near-real-time and post-processed resistivity map with a borehole placed within a subsurface volume. At step 800, a priori data is gathered to initialize a resistivity model. This data can include a wide variety of information ranging from a simple geological section taken from seismic data to models and results gathered from previously drilled wells, such as resistivity logs or estimated characteristics based on such information from other, similar, geologies or formations. Once the initial models are completed in step 805, the preferred sensor, source and activation (source characteristics such as frequency, amplitude and signal shape) configurations for the surface and downhole systems are determined in step 810. This information is then used to install the surface portion of the system in step 815, conduct a pre-well EM survey to establish a baseline response of the subsurface geology in step 820 and confirm the initial resistivity model in step 825. Any adjustments needed to improve response are made to the surface system. Then, the downhole system (part of the BHA) is configured in step 830, and drilling operations are undertaken. During the drilling process, the overall system is controlled and monitored in step 835, with this monitoring occurring continuously or at discrete points during drilling (on-bottom) and/or drilling breaks (off-bottom). Within step 835, the sources are controlled and sensor data is gathered at step 835A. This includes transmitting at least one component of an electromagnetic field through the earth between the downhole drilling tool and a distant earth region and acquiring subsurface data from the at least one component of the electromagnetic field. This data is then processed in step 835B and passed to the resistivity mapping algorithm, which computes a resistivity map in step 835C by calculating a resistivity distribution of the distant earth region from the subsurface data. The output is then compared, in step 835D, to resistivity measurements made by traditional downhole resistivity tools to minimize accuracy and distance errors. At step 835E, the position of the bottom hole assembly within the resistivity volume is identified. If necessary, the surface and/or downhole systems can be reconfigured during the drilling process, in step 835F, to either improve system data quality or as planned by the pre-well modeling. Steps 835A-F are repeated throughout step 835. After the drilling is complete and the bottom hole assembly is retrieved to the surface, the downhole stored and/or processed data is retrieved in step 840, and enhanced processing is completed in step 845 using the higher density and/or higher resolution data that was not transmitted to surface during the drilling process. This data can follow the same processing method described in connection with step 835 or any other that would allow for higher resolution information. For example, after the data is processed in step 845, the data can be passed to the resistivity mapping algorithm, which computes a final resistivity map in step 850. The output is then compared, in step 855, to resistivity measurements made by traditional downhole resistivity tools to minimize accuracy and distance errors. At step 860, the final position of the bottom hole assembly within the resistivity volume is identified.

The knowledge relating to the location of the bottom hole assembly and the area around the bottom hole assembly (particularly in front of the bottom hole assembly) is used to guide drilling (i.e., for geosteering) and/or to determine the trajectory of the wellbore. Better geosteering improves drilling efficiency, increases oil and/or gas production, extends life-of-field and avoids subsurface features that cause drilling problems, including but not limited to hydrates, karsts and/or geological features that result in lost drilling fluids or muds. Better estimation of wellbore trajectory improves overall field design, exploration, production, and life-of-field, as well as minimizes completion issues and maintenance.

Capacitive electric-field sensors are inert and therefore do not require a chemical exchange in order to couple to the surrounding medium, which improves sensitivity, repeatability and allows the sensors to effectively operate in all subsurface environments. As discussed above, the capacitive sensors of the present invention can be used in place of other sensors or added to locations that previously did not include sensors. For example, capacitive sensors can replace galvanic electrodes on various logging tools or cross-well tools including but not limited to induction loggers, measurement-while-drilling tools, logging-while-drilling tools, logging-while-tripping tools, and all other tools for resistivity logging or electromagnetic data acquisition. As another example, capacitive sensors can be added to downhole tools or assemblies that do not have galvanic electrodes in order to add a resistivity logging or electromagnetic data acquisition functions. The cost of deploying systems or tools downhole is expensive so adding measurement functionality to such systems or tools already being deployed for other purposes adds little incremental cost while increasing value of tool or system deployment.

Based on the above, it should be readily apparent that the present invention provides for the creation and use of subsurface resistivity mapping with sufficient accuracy and distance resolution for use during the planning, drilling, logging, and reservoir exploration and production processes. In particular, the invention specifically provides for resistivity mapping of a distant earth region utilizing any part of a downhole drilling tool, including but not limited to the bottom hole assembly and/or drill string, as either a transmitter and/or receiver of at least one component of a generated electromagnetic field, whether for mapping or looking in front of the downhole drilling tool or mapping, imaging or characterizing a large volume of earth between a drilling tool in a borehole and either one or more surface or near surface locations or one or more additional boreholes. Therefore, in accordance with the invention, "distant" takes on a particular meaning, i.e.: at least 100 feet in front of the downhole drilling tool such as for steering purposes; between the drilling tool and the surface or near surface, which will at least be in the order of 500 feet but more typically from 1000-10,000 feet or more; or between the downhole drilling tool located in a first borehole and at least one sensor and/or source located in one or more other second boreholes spaced at least 100 feet, and even as much as 10,000 feet or more, from the first borehole. In each of these three scenarios, the method of performing the geophysical earth survey capitalizes on utilizing the downhole drilling tool as either a transmitter or receiver and includes transmitting at least one component of an electromagnetic field within the earth between the downhole drilling tool and a distant earth region, acquiring subsurface data from the at least one component of the electromagnetic field, and calculating a resistivity distribution of the distant earth region from the subsurface data. Correspondingly, the system includes the related structure to carry out this operation. Overall, the invention also improves the understanding of the macro level view or image of subsurface formation fluids and the position of the wellbore with respect to those fluids, preferably via the use of capacitive sensors, one or more sources and processing software. Although described with reference to preferred embodiments, it should be readily understood that various changes or modifications could be made to the invention without departing from the spirit thereof. In general, the invention is only intended to be limited by the scope of the following claims.

The invention claimed is:

1. A method of performing a geophysical survey in a borehole made with a downhole drilling tool, the method comprising:
    transmitting at least one component of an electromagnetic field through the earth between the downhole drilling tool and a distant earth region located in front of the downhole drilling tool, wherein the downhole drilling tool establishes a transmission point or a receiving point for the at least one component of the electromagnetic field;
    acquiring subsurface data about the distant earth region from the at least one component of the electromagnetic field;
    calculating a resistivity distribution of the distant earth region from the subsurface data while the downhole drilling tool is moving; and
    steering the downhole drilling tool, wherein the downhole drilling tool is guided based on at least a portion of the subsurface data and the resistivity distribution of the distant earth region.

2. The method of claim 1, wherein the downhole drilling tool establishes the transmission point for the at least one component of the electromagnetic field.

3. The method of claim 2, further comprising measuring the electromagnetic field with a plurality of spaced, surface or near surface sensors.

4. The method of claim 3, wherein at least two of the plurality of surface or near surface sensors are spaced by at least ⅕ mile.

5. The method of claim 1, wherein the downhole drilling tool establishes the receiving point for the at least one component of the electromagnetic field.

6. The method of claim 5, wherein the receiving point is established by a capacitive sensor carried by the downhole drilling tool.

7. The method of claim 6, wherein the at least one component of the electromagnetic field is transmitted from a plurality of spaced, surface or near surface transmitters to the capacitive sensor.

8. The method of claim 7, wherein at least two of the plurality of spaced, surface or near surface sensors are spaced by at least ⅕ mile.

9. The method of claim 5, wherein the at least one component of the electromagnetic field is transmitted from a plurality of spaced, surface or near surface transmitters to a sensor carried by the downhole drilling tool.

10. The method of claim 1, wherein the distant earth region extends from a borehole in which the downhole drilling tool is located to at or near a surface region of the earth.

11. The method of claim 1, wherein the distant earth region extends from a first borehole in which the downhole drilling tool is located to a second borehole located remote from the first borehole.

12. The method of claim 1, further comprising:
    determining a position or trajectory of the downhole drilling tool based on the resistivity distribution.

13. A system for performing a geophysical survey comprising:
    a downhole drilling tool adapted to be placed in a borehole formed in the earth, said downhole drilling tool having mounted thereto at least one of a transmitter for generating and a receiver for sensing at least one component of an electromagnetic field within the earth between the downhole drilling tool and a distant earth region located in front of the downhole drilling tool;
    a device configured to acquire subsurface data about the distant earth region from the at least one component of the electromagnetic field; and
    a device configured to calculate a resistivity distribution of the distant earth region from the subsurface data while the downhole drilling tool is moving, wherein at least a portion of the subsurface data and the resistivity distribution of the distant earth region is used in steering the downhole drilling tool.

14. The system of claim 13, wherein the downhole drilling tool establishes a transmission point for the at least one component of the electromagnetic field.

15. The system of claim 14, wherein the device configured to measure the subsurface data includes a plurality of spaced, surface or near surface sensors.

16. The system of claim 15, wherein at least two of the plurality of surface or near surface sensors are spaced by at least ⅕ mile.

17. The system of claim 13, wherein the downhole drilling tool establishes a receiving point for the at least one component of the electromagnetic field.

18. The system of claim 17, wherein the receiving point is established by a capacitive sensor carried by the downhole drilling tool.

19. The system of claim 18, further comprising: a plurality of spaced, surface or near surface transmitters for transmitting the at least one component of the electromagnetic field to the capacitive sensor.

20. The system of claim 19, wherein at least two of the plurality of spaced, surface or near surface sensors are spaced by at least ⅕ mile.

21. The system of claim 13, wherein the distant earth region extends from a borehole in which the downhole drilling tool is located to at or near a surface region of the earth.

22. The system of claim 13, wherein the distant earth region extends from a first borehole in which the downhole drilling tool is located to a second borehole located remote from the first borehole.

23. The system of claim 13, wherein the resistivity distribution is used to determine a position or a trajectory of the downhole drilling tool.

* * * * *